United States Patent [19]
Forsberg

[11] 4,289,579
[45] Sep. 15, 1981

[54] METHOD FOR TREATING A BULK MATERIAL WITH A FLUID

[76] Inventor: Georg L. K. Forsberg, Nylandsgatan 14, 654 65 Karlstad, Sweden

[21] Appl. No.: 129,381

[22] PCT Filed: Dec. 11, 1978

[86] PCT No.: PCT/SE78/00092
§ 371 Date: Aug. 10, 1979
§ 102(e) Date: Aug. 10, 1979

[87] PCT Pub. No.: WO79/00375
PCT Pub. Date: Jun. 28, 1979

[30] Foreign Application Priority Data

Dec. 12, 1977 [SE] Sweden .................... 7714043

[51] Int. Cl.³ .................... D21C 1/02; D21C 7/02
[52] U.S. Cl. .................... 162/58; 8/156; 34/135; 162/60; 162/68; 209/452; 366/186
[58] Field of Search .................... 162/52, 60, 68, 100, 162/244, 246, DIG. 12, 57, 58, 19, 18; 366/102, 186, 224; 8/156; 34/128, 135, 137; 209/451, 452, 463, 464; 426/419, 506, 511

[56] References Cited

U.S. PATENT DOCUMENTS 3,401,085  9/1968  Croon et al. ................ 162/DIG. 12

FOREIGN PATENT DOCUMENTS

| | | | |
|---|---|---|---|
| 2730283 | 1/1979 | Fed. Rep. of Germany | 366/224 |
| 404684 | 10/1978 | Sweden . | |
| 386046 | 9/1973 | U.S.S.R. | 162/246 |
| 539110 | 1/1977 | U.S.S.R. | 162/57 |
| 592902 | 3/1978 | U.S.S.R. | 162/246 |

Primary Examiner—S. Leon Bashore
Assistant Examiner—Steve Alvo
Attorney, Agent, or Firm—Murray and Whisenhunt

[57] ABSTRACT

A bulk material is treated in a drum rotating in a bulk of the bulk material to be treated. The drum (16, 68) is provided with feeding-in openings (28, 70) in the cylindrical face of the drum. The bulk material tumbles around in the drum and is conveyed towards a discharge part in one end of the drum by means of a worm conveyor in the drum rotating in opposite direction to the drum. A treatment fluid is introduced into the drum through apertures (11a, 85) in the shaft of the worm conveyor. After the fluid has treated the bulk material in the drum it is led away through the same openings (28, 70) as those through which the bulk material is continuously being fed into the drum. Further the fluid advances up into the bulk of bulk material which therethrough also is treated before the material is fed into the drum. The method and the apparatus is particularly intended for treating pulp wood chips, e.g. for pre-steaming chips and for washing chips. In the former case one or more drums are provided horizontally in a container for the chip material, closely above the bottom of the container. In the latter case the drum is provided slopingly for conveying the chip material up through the container at the same time as the chip material is being washed.

5 Claims, 3 Drawing Figures

METHOD FOR TREATING A BULK MATERIAL WITH A FLUID

FIELD OF THE INVENTION

The present invention relates to a method of treating a bulk material with a gaseous, vaporous, or liquid fluid. For example the invention relates to a method of presteaming or other treatments of chopped wood chips for cellulose production by means of a fluid in the form of water steam. The invention also relates to an apparatus for carrying out the method.

Another example of how the invention may be applied is the treatment of chopped wood pulp chips in order to thaw snow and ice which frequently exist in northern countries in bulks of chips which are stacked outdoors and which often cause problems in the initial part of the chip treatment prior to digesting. Another example of the applicability of the invention is for drying grain or other particulate materials wherein the treatment fluid normally is hot air. Another area where the principles of the invention may be applied is for effecting chemical reactions between a fluid in the form of a reactive gas, vapour or liquid, and for example a mineral concentrate. A further example of the applicability of the invention is for washing solid particles or objects, wherein the fluid may be a liquid washing or solution agent. This application of the invention may be used i.a. for washing wood chips with water in order to remove gravel, sand and similar heavy contaminations.

BACKGROUND ART

The Swedish Pat. No. 221 188 discloses a method and an apparatus for cleaning chopped cellulose chip material from accompanying foreign particles. The apparatus comprises a dewatering device equipped with a worm conveyor which suitably is inclined and surrounded by a perforated wall. During the course of the chip being fed upwards in the worm conveyor finer impurities such as sand particles are separated. The separated particles pass through the perforated wall together with the water and are fed through a conduit to a sand trap. The perforations of the partition wall are adapted to the size of the impurities which shall be removed, which means that the size of the perforations is chosen such that the chips essentially cannot pass therethrough but substantially proceed upwards and are delivered to an outlet. Due to the fact that the chip material is fed in at one end and discharged at the other end without being able to pass through the perforated wall the bulk of chip material in the helicoidal passageway through the worm conveyor will be comparatively compact. Nor does the worm to any significant extent tumble around the bulk of chips in the conveyor, and therefore the washing of the chips during the transportation of same through the conveyor will not be highly efficient.

The Swedish Pat. No. 171 489 discloses an apparatus for drying malt or other lump material. The apparatus comprises a rotatable cylindric drum through which the material to be dried is brought to pass from one gable to the other. The rotating drum is surrounded by a fixed drum so that a sectioned annular space is formed between the drums. Air for drying the material in the inner drum is fed in and led away through the semi-circular channels in the annular space. Further there is provided a central worm in the inner drum for conveying the material. The apparatus has i.a. the limitation that the outer drum excludes the possibility of treating material also outside the rotating drum simultaneous with the treatment of material inside the drum. The apparatus also is based on the principle that the apertures in the perforated drum are so small that only the treatment fluid, in this case air, can pass through the apertures but not the material to be treated. The latter therefore cannot pass in or out through the cylindrical wall of the drum during the treatment which renders any homogenous feeding-in of new material along the perforated length of the drum impossible at the same time as finished material is discharged through the end of the drum.

In certain respects similar but in still higher degree closed systems are shown in the Norwegian Pat. No. 27 159 and the Danish Pat. No. 15 876.

Further there is disclosed in the Swedish Pat. No. 398 633 an apparatus for discharging vessels. The apparatus comprises a vertical fixed non-perforated drum with a central worm conveyor. The shaft of the worm conveyor is perforated so that compressed air or other fluid can be injected through the shaft into the helicoidal passage way of the conveyor which facilitates the transportation through the drum. But due to the fact that the drum is fixed it is nor by means of this apparatus as in the apparatus according to the Swedish Pat. No. 221 188 achieved any tumbling action, and as the apparatus moreover is totally encased, i.e. non-perforated, there is nor achieved any interaction with or affect upon the environment of the drum.

DESCRIPTION OF THE INVENTION

The above mentioned drawbacks and limitations of previous methods and apparatuses may be eliminated through the invention therein that the bulk material is treated in a drum surrounded by a bulk of the material to be treated, that the bulk material is fed in into the drum through openings in the cylindrical face of the drum, that said fluid is introduced into the helicoidal space between a worm conveyor for said bulk material inside the drum and the drum encasing the worm conveyor, said worm conveyor being rotated in a direction opposite to that of the drum making the treatment of the bulk material in the drum more efficient due to the obtained loose distribution of the bulk material in the drum and due to the fact that the bulk material tumbles around in the drums, and that at least a portion of the fluid is caused to leave the drum through the same openings in the cylindrical face of the drum as those through which the bulk material is being fed in.

When the invention is utilized for presteaming pulp wood chips the worm conveyor with the surrounding hole-provided drum is mounted in a chip bin, suitably closely above the bottom of the chip bin in order to discharge the chip material from the bin in the lower portion of the bin. After the steam has been contacted with the bulk of chips which presently exists in the drum, the steam proceeds via the openings in the drum up into the bulk of chips in the bin so that also this bulk of chips successively is presteamed which is made possible through the fact that the drum is located in and is surrounded by the chip material in the chip bin. The chip material in other words will meet the steam as the steam successively is advancing downwards in the bin wherethrough the steam is very efficiently utilized. The good presteaming effect also is stimulated by the fact that the chip material in the bin is kept moving by the rotating hole-provided drum in the bottom section of the bin. Suitably also a corresponding worm conveyor with surrounding drum is provided in the upper part of the bin for feeding in chip material into the bin. In that case however, the principles of the invention are utilized only partially.

Also in the case when it is aimed at using the invention e.g. for washing wood chips the worm conveyor is provided with the surrounding drum in the bulk of bulk material, suitably closely over the bottom of the vessel—the washing tub—which then is made sloping as the "tube-feeder". The washing water is suitably fed in counter-currentwise into the drum and therefrom into the washing tub, while the chip material is discharged up from the vessel through the drum.

In order to introduce the treatment fluid in an efficient manner into the helicoidal passage of the worm it is suitable for that purpose to use the shaft of the worm conveyor which hence is perforated. The apertures in the shaft of the worm conveyor are suitably so small that pulp material to be treated essentially shall not be able to pass through while the number of perforations on the other hand is sufficient to obtain the desired flow of the fluid to be injected. This means that the apertures in the shaft of the worm conveyor have a size of a quite different order than the openings in the cylindrical face of the drum which openings shall be so large that the bulk material without difficulty may pass through. The principle thus is that the fluid is urged into the space between the shaft of the worm conveyor and the cylindrical face of the drum via the apertures in the shaft of the worm conveyor, that the fluid is caused to contact the bulk material in the drum, and that the fluid thereafter is caused to leave the drum through the openings in the cylindrical face of the drum, said fluid then meeting the pulp material which is continuously fed in through said openings.

The advantages and principles of the invention will be apparent more in detail from the following description of two preferred embodiments.

BRIEF DESCRIPTION OF DRAWINGS

In the following description of two preferred embodiments it will be referred to the accompanying drawings, in which.

Figure 1:
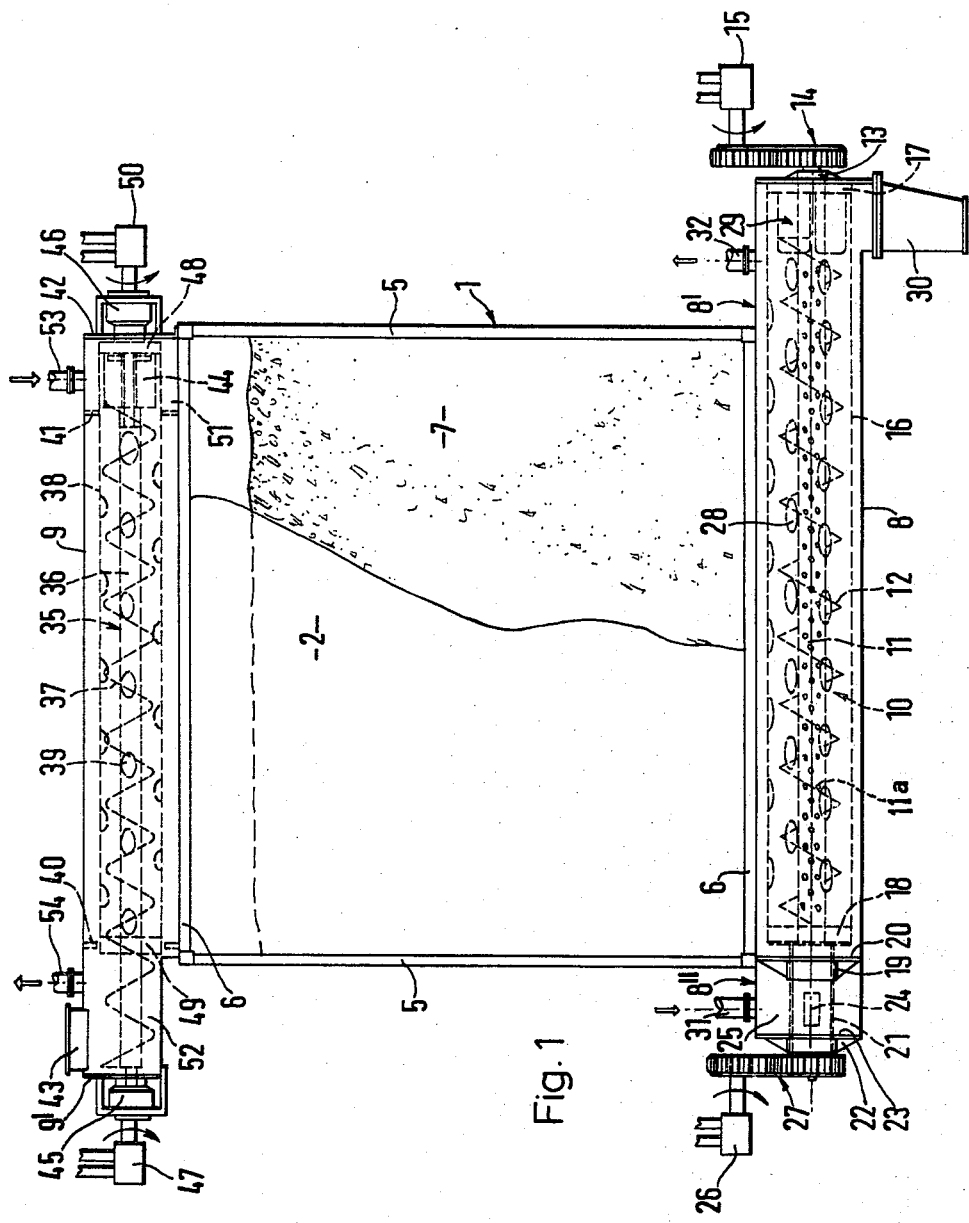
FIG. 1 is a side view of a plant for presteaming wood pulp chips.

In the drawings only such details are shown which are important for the understanding of the invention, while other details have been omitted in order to make the essential parts more clear.

DESCRIPTION OF PREFERRED EMBODIMENTS

Figure 2:
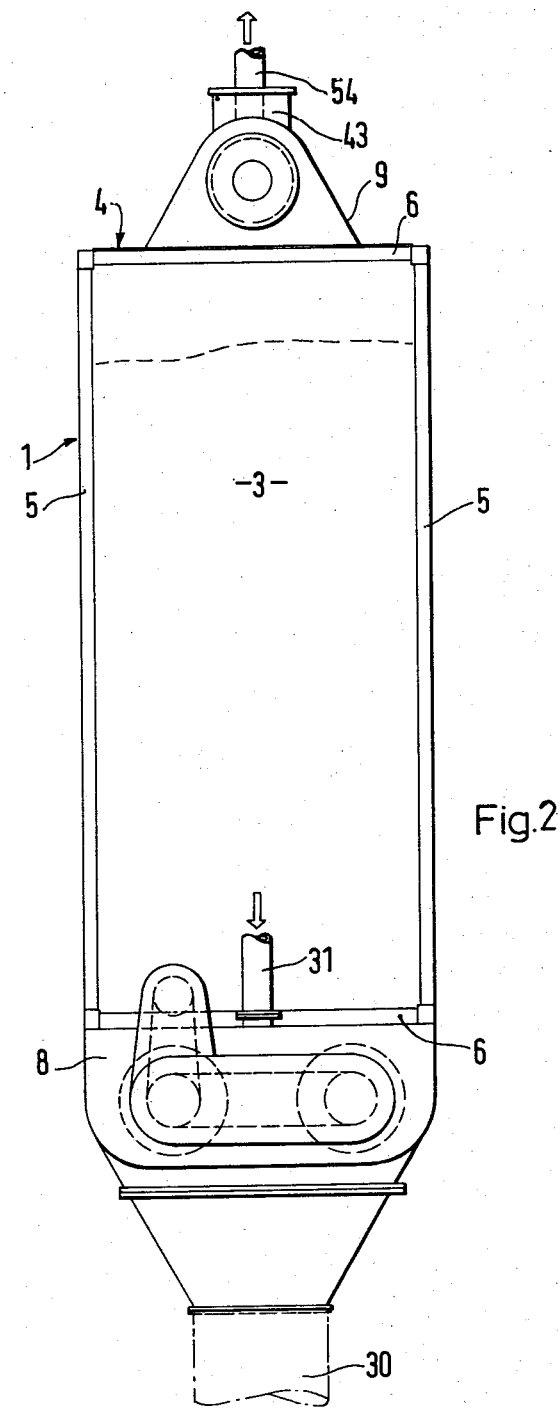
FIG. 2 shows the same plant from the left in FIG. 1.

Referring to FIGS. 1 and 2 a container for chopped wood chips for cellulose production has been generally designated 1. The container 1 has two length sides 2 and two gables or short sides 3. The sides 2, 3 and roof 4 consist of sheets connected by vertical beams 5 and horizontal beams 6. The front side 2 has been partly cut up in FIG. 1 to demonstrate the bulk of wood pulp chips 7 in the container. The bottom portion has the shape of tub or trough 8, which extends past the two short sides 5 of the container. The extending portions have been designated 8' and 8''. In a longitudinal opening in the roof sheet 4 there is provided a vaulted top structure 9.

In the trough 8, just over the bottom, there are horizontally mounted two parallel worm conveyors 10. Each of these worm conveyors consists of a shaft 11 and a screw blade 12 attached thereto. The shafts are mounted in one end in bearings 13 and are driven by a joint hydraulic motor 15 via a chain gearing 14 which is not disclosed in detail in the drawings.

Each worm conveyor 10 is surrounded by a concentric drum 16 extending along the whole length of the worm conveyor and projecting past its ends. That end of the drum 16 which is turned to the shaft bearing 13 is mounted on the shaft 11 by a bearing 17. The opposite end of the drum 16 is mounted on the shaft 11 by a support bearing 18, the supports being designed like propeller blades attached to the drum 16. The propeller blades of the support bearing 18 are by welding joined to a shaft portion 21 having the form of a sleeve mounted in a bearing 19 in a partition wall 20 and in a bearing 22 in an end wall 23. Between the walls 20 and 23 the sleeve 21 is provided with four openings distributed around the circumference of the sleeve. The chamber between the walls 20 and 23 has been designated 25. The sleeve 21 and hence the support bearing 18 and the drum 16 are provided to be rotated in the opposite direction to the shaft 11 by means of a hydraulic motor 26 via a chain gear 27. Both the drums 16 are analogously designed, i.e. provided with support bearings 18, sleeves 21 etc and are driven by the joint hydraulic motor 26 via the chain gear 27. In each drum there are made a number of openings in the form of oval holes 28 which are distributed over the whole length of the cylindrical face of drum between the support bearing 18 and a line parallel with the further (referring to the support bearing 18) short side 3 of the container 1, or possibly a little bit further. The holes 28 are also distributed around the periphery of the drum 16 so that in each section of the drums there is at least one hole 28. Suitably the holes 28 are distributed helically around the drums. Further the holes 28 are so big that the bulk material to be treated, i.e. the chip material 7, readily may pass through the holes. The size of the holes 28 in the cylindrical face of the drum 16 thus is of a quite different order than the small apertures 11a in the shaft 11.

In the further end of the extension 8' of the trough 8 each drum 16 is provided with six larger substantially rectangular openings 29 above a chip discharge conduit 30. Further, according to the invention, a conduit 31 for feeding steam is connected to the chamber 25 in the extension 8'' in the left hand part of trough, and a conduit 32 for drawing off of surplus steam is connected to the extension 8' in the right hand part of the trough.

In the top structure 9 there is provided one single worm conveyor 35 having a shaft 36 and a screw blade 37 attached thereto. In the manner as has been described with reference to the equipment in the trough 8, the worm conveyor 35 in the top structure 9 is surrounded by a drum 38 having holes along its whole length between two partition walls 40 and 41. The former front partition wall 40 is provided in that end of the drum 38 which is turned to that end where the chips are fed in, while the latter, the rear partition wall 41 is provided at a distance from the further gable 42 of the top structure 9. Between the front partition wall 40 and the drum 9 there is an annular gap through which gases can pass.

while the rear partition wall 41 is tightly engaged to the surface of the drum 38.

In the chip feeding-in end the top structure 9 has an extension 9' provided with a connection 43 for feeding chips to a chamber 52 defined by said extension. In the discharge end, in a discharge chamber 51 between the partition wall 41 and the gable 42, the drum 38 is provided with a number of larger chip discharge openings 44. The shaft 36 is mounted in end bearings 45 and 46, and is driven by an hydraulic motor 47. The drum 38 is mounted in an end bearing 48 and in a support bearing said type which has been previously described and which is provided with supports in the form of propeller blades. The drum 38 is driven in a direction opposite that of the worm conveyor 35 by means of an hydraulic motor 50. A connection for supplying steam into the chamber 51 in the chip charging end has been designated 53.

The described apparatus operates in the following manner. Chip material is fed into the entry chamber 52 through the connection 43 from a stack which as a rule is located in the open. The motor 47 rotates the worm conveyor 35 in such a direction that the chip material is fed through the support bearing 49 into the drum 38 and progressively towards the discharge openings 44. Through the discharge openings 44 the chip material falls down into the container 1. Part of it also falls down into container 1 through the openings 39 in the cylindrical face of the drum 38 which is facilitated by the fact that the drum at the same time is rotated in the opposite direction to that of the worm conveyor 35.

Steam is supplied to the chip discharge chamber 51 through the connection 53. From the chamber 51 steam is pressed—sucked—in through the chip discharge openings 44 and progressively into the drum 38. Part of the steam goes out through the openings 39 and into the space between the drum and the casing which forms the roof and wall of the top structure 9 and therefrom through the gap between the partition wall 40 and the drum 38 into the chip entry chamber 52. The main portion of the steam is, however, pressed—sucked—helically forwards between the inside of the drum 38 and the screw blade 37 and hence meets the chip material which is continuously fed into the drum. Part of the steam is condensed upon the chips and/or attributes in melting snow and ice which in winter time as a rule accompany the pulp wood chip material which is being fed in. Surplus steam pass through the support bearing 49 into the chip entry chamber 52 wherefrom the steam is sucked out through conduit 54.

The equipment in the bottom portion of the apparatus operates in the following manner. The bulk 7 of chip material is successively fed through the openings 28 in the cylindrical faces of the drums 16 into the two rotating drums 16 in which the chip material forms a loose body of chip material tumbling around in the drums at the same time as the chip material is forced towards the discharge openings by means of the worm conveyor 10. The drums 16 therefore can be said to be digging around in the bulk 7 of chip material which homogeneously is fed into the drums over substantially the entire bottom area of the container 1. At the same time the rotating drums 16 give rise to a certain movement in the entire bulk 7. Steam is fed into the chamber 25 through the steam connection 31. From the chamber 25 steam is pressed—sucked—into each sleeve 21 through the openings 24 and from the sleeves 21 into the tubular shaft 11 and therefrom into the respective drum 16 through the apertures 11a. In the drums 16 the steam meets the loose body of chip material which is tumbling around and which then is efficiently presteamed by the steam. The efficient stirring and the loose body of chip material is then of essential importance for a good presteaming result. Surplus steam is led away through conduit 32 while the main part is utilized for presteaming wood chip material. This is performed in the first place in the drums 16 where the steam is caused to contact the bulk of chip material which continuously is fed in through the openings 28 in the cylinrical faces of the drums but also in the container 1 through the fact that the main part of the steam successively will pass out through the openings 28 in the drums, where the steam will meet the chip material which is being fed in through the same openings, whereupon the steam will advance up through the bulk 7 of chip material. The presteaming action can be stimulated by suitably adapting the pressures in the conduits 31, 32 and 53, 54 to each other. As the chip material 7 is successively fed down in the container 1 it will thus meet warmer and more "virgin" steam wherethrough the presteaming result is made more efficient and the steam will be utilized in a more optimal way. In order further to improve the efficiency of the treatment, more particularly to make the stirring of the bulk of chip material in the container and the "digging function" of the drum more efficient the drums 16 may be movable sideways and/or in the vertical direction in the container 1.

Figure 3:
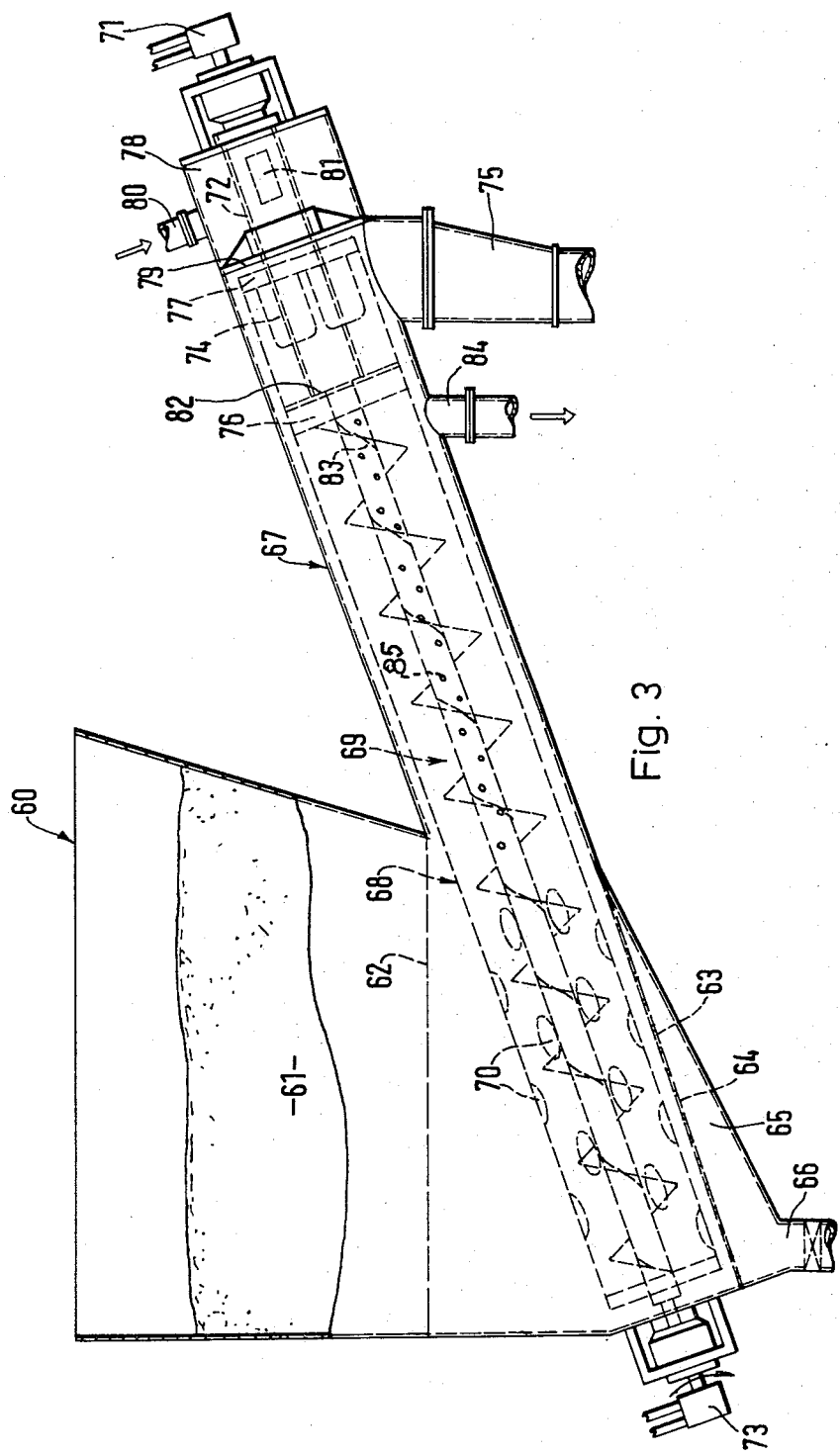
FIG. 3 is a side view of a plant for washing wood pulp chips.

Referring now to FIG. 3 a vessel or tub for washing of wood chips is generally designated 60. The bulk of wood chips intended to be washed is designated 61. The washing vessel 60 is filled with water up to a level 62 which is determined by a spillway 84. The bottom 63 of the vessel is dished and is inclined upwards. Further the bottom 63 is perforated by holes 64 for the transfer of small stones, sand and other heavy pollutants to a bottom pocket 65. From the bottom pocket the heavy pollutants can be removed through a conduit 66. The perforated floor plate or strainer 63 can be cleansed by back-washing with water through conduit 66.

A cylindrical chip conveying tube 67 extends slopingly up from the vessel 60. In the tube 67, just above the perforated bottom 63, there is provided a drum 68 with a worm conveyor 69. The drum 68 is provided with passage openings in the form of oval holes 70 in the region of the vessel 60 but preferably not in the region of the tube 67. The drum 68 is provided to be rotated by a motor 71 via a sleeve shaped shaft portion 72, while the worm conveyor 69 is provided to be rotated in the opposite direction by a motor 73. Suitably the drum 68 is provided with external flanges, tappets, or other projecting members which may move chips in the bulk of chips 61 forward at the rotation of the drum. Due to the rotation of the drum 68 and the worm conveyor 69 chips are fed into the drum through the holes 70 and are transported up from the vessel 60 through the tube 67 and out from the tube through discharge openings 74 in the upper end of the drum 68. A discharge conduit 75 for washed chips is provided below said discharge openings 74. More particularly said openings 74 are provided between a support bearing 76 of the type above described and an end bearing 77.

The sleeve shaped shaft portion 72 extends through the end bearing 77 of the drum and is fastened by welding to the support bearing 76. Further the sleeve 72 extends through an intake chamber 78 for fresh washing water and through a partition wall 79. A connection conduit for fresh washing water to chamber 78 has been designated 80. In the region of the intake chamber 78 the sleeve 72 is provided with a number of intake openings 81 for fresh washing water whch is fed into chamber 78 through conduit 80. From chamber 78 the washing water is brought into the sleeve 72 through the openings 81, and from the sleeve 72 it is thereafter brought into the drum 68 via a narrow space 82 between the sleeve 72 and the shaft 83 of the worm conveyor. Fresh washing water consequenty continuously meets the chips which continuously are transported upwards in the drum 68 from the washing vessel 60. Used washing water is drained off through the spillway 84 in the upper part of the tube 67, whereafter the water can be recirculated and reintaken into the chamber 78 through conduit 80, possibly after straining or other purification. The majority of heavy particles existing in the bulk of chips are removed already in the vessel 60 when the chips are agitated by the drum 68 and sink down to the bottom 63 and are collected in the pocket 65. Such heavy particles which, however, are introduced into the drum 68 are forced downwards through the drum by means of the washing water which is taken in in the upper part of the drum in the manner above described and are discharged from the drum together with the washing water through the openings 70 in the lower part of the drum. A very efficient washing takes place in the drum due to the fact that the quantity of chips in the drum is not compact but loose and is agitated, and to the fact that fresh washing water is continuously supplied countercurrentwise.

I claim:

1. Method of treating a bulk of bulk material with a fluid, said method comprising treating the bulk material in a drum, which is surrounded by a bulk of the material to be treated, said drum including a plurality of openings distributed over the cylindrical face of the drum and a worm conveyor for said bulk material inside said drum, by feeding the bulk material into said drum through said openings while rotating said drum around its axis in said bulk of bulk material, introducing said fluid into the helicoidal space between said drum and said worm conveyor, rotating said worm conveyor at least at times in a direction opposite to that of the drum, to make the treatment of the bulk material more efficient due to the obtained loose packing of the bulk material in the drum and due to the fact that the bulk material is tumbled around, causing at least the main portion of the fluid to leave said drum through the same openings in the cylindrical face of the drum as those through which the bulk material is being fed in, and also treating material in the bulk material above the drum with the fluid passing through said openings in the drum.

2. Method according to claim 1, wherein the bulk of said bulk material surrounding said drum is located within a container, and said bulk of said bulk material is only discharged from said container by way of the space between said worm conveyor and said drum.

3. Method according to any of claim 1 or claim 2 wherein said fluid is introduced into the drum through apertures in the worm conveyor shaft and passes through the space between the worm conveyor and the cylindrical face of the drum in order to treat bulk material tumbling around in said space before the fluid passes through the openings in the cylindrical face of the drum, said fluid then treating the bulk material which continuously is fed into the drum along the entire part of the length of the drum which is provided with openings.

4. Method according to claim 1 or claim 2 wherein the bulk material consists of wood chips and the fluid consists of steam for presteaming the chips.

5. Method according to claim 1 or claim 2 wherein the treatment is performed while the bulk material is transported upwardly by means of a sloping worm conveyor and the rotating drum enclosing the worm conveyor, and said fluid is a liquid said fluid is fed into the drum in the upper part of the drum and discharged from the drum through passage openings in the lower part of the drum.

* * * * *